(12) United States Patent
Hrishikesh

(10) Patent No.: US 7,876,777 B2
(45) Date of Patent: Jan. 25, 2011

(54) MULTIPLE PROTOCOL DECODER

(75) Inventor: Karthik Hrishikesh, Kerala State (IN)

(73) Assignee: Honeywell International Inc., Morristown, NJ (US)

( * ) Notice: Subject to any disclaimer, the term of this patent is extended or adjusted under 35 U.S.C. 154(b) by 766 days.

(21) Appl. No.: 11/027,389

(22) Filed: Dec. 30, 2004

(65) Prior Publication Data

US 2006/0146726 A1  Jul. 6, 2006

(51) Int. Cl.
*H04J 3/22* (2006.01)

(52) U.S. Cl. .................................. 370/465; 709/224

(58) Field of Classification Search .................. None
See application file for complete search history.

(56) References Cited

U.S. PATENT DOCUMENTS

| | | | |
|---|---|---|---|
| 5,418,963 A | 5/1995 | Anezaki et al. | |
| 5,537,417 A | 7/1996 | Sharma et al. | |
| 5,649,227 A | 7/1997 | Anezaki et al. | |
| 6,182,261 B1 | 1/2001 | Haller et al. | |
| 6,523,058 B1 | 2/2003 | Fung et al. | |
| 6,564,265 B2 | 5/2003 | Tillmann et al. | |
| 6,578,170 B1 | 6/2003 | Piret et al. | |
| 6,816,455 B2 * | 11/2004 | Goldberg et al. | 370/230 |
| 7,171,473 B1 * | 1/2007 | Eftis et al. | 709/224 |
| 2002/0049930 A1 | 4/2002 | Hannigan | |
| 2002/0156886 A1 * | 10/2002 | Krieski et al. | 709/224 |
| 2004/0199630 A1 * | 10/2004 | Sarkissian et al. | 709/224 |

FOREIGN PATENT DOCUMENTS

| | | |
|---|---|---|
| EP | 1089522 A2 | 4/2001 |
| EP | 1175764 | 1/2002 |
| JP | 2001-53825 | 2/2001 |

OTHER PUBLICATIONS

"U.S. Appl. No. 11/027,389, Advisory Action mailed Jul. 2, 2008", 3 pgs.

* cited by examiner

*Primary Examiner*—Chi H Pham
*Assistant Examiner*—Mohammad S Adhami
(74) *Attorney, Agent, or Firm*—Schwegman, Lundberg & Woessner P.A.

(57) ABSTRACT

A generic protocol decoder is described for deciphering multiple protocols without requiring unique decoders for each protocol. Object patterns are created for each protocol, each pattern containing state and algorithm objects. These state and algorithm objects perform a portion of the deciphering of each packet and may be reused in multiple patterns. Thus, new protocols may deciphered using existing state and algorithm objects arranged in a new pattern. If new state and algorithm objects are required to decode a new protocol, only the portions not handled by existing objects need be inserted into the system.

19 Claims, 2 Drawing Sheets

MULTIPLE PROTOCOL DECODER

BACKGROUND

A variety of data communication and processing devices are used to transmit and analyze sequences of digital data. Such a sequence, commonly in a desired protocol, is ordered and organized by a set of rules and regulations, referred to as a protocol specification. A packet or logical unit of such a protocol is termed a protocol data unit (PDU).

Different applications are used to analyze protocols in data communications. These applications may decode the protocol and validate its correctness. Protocol analyzers that monitor a live network topology are one type of such an application. This may allow the user to view summary and detail information for each packet. However, such an application is limited to data capture. Another protocol analyzer may capture the actual packets and perform statistical analysis, discerning protocol and application problems. Such protocol analysis applications are reliant on the protocol that it analyzes. In the event the protocol specification is changed or a new protocol is analyzed, the system will no longer function properly. While common protocols are easily handled and decoders are widely available for these, less common protocols may be covered scantily or not at all. Typically, the more proprietary a protocol, the less likely that there will be a widely available decoder for it.

Thus, there is a need for a system that can decode a great number of protocols, without being dependant on a protocol specification that might not be available. There is a need for a system that is scalable and handles changes or new protocols with little or no additional work.

SUMMARY

Data communications are monitored for a protocol data unit. One of a plurality of patterns is selected as a function of a specified protocol of the protocol data unit. Each pattern has an object associated with an algorithm. The algorithm is used to decode the protocol data unit.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

In one embodiment, a system has a serial monitor application (SMA) that monitors data traffic over a serial line. A decode manager is connected to the SMA and operates on protocol data units (PDU) monitored by the SMA. The decode manager decodes a PDU according to a pattern associated with the specified protocol of the PDU. A plurality of such patterns are stored by the decode manager. Each pattern works to decode a particular protocol, but multiple patterns may share components. Thus, patterns may be easily created and the system can handle generic protocol decoding during run time without the need for a pre-programmed decoder.

Figure 1:
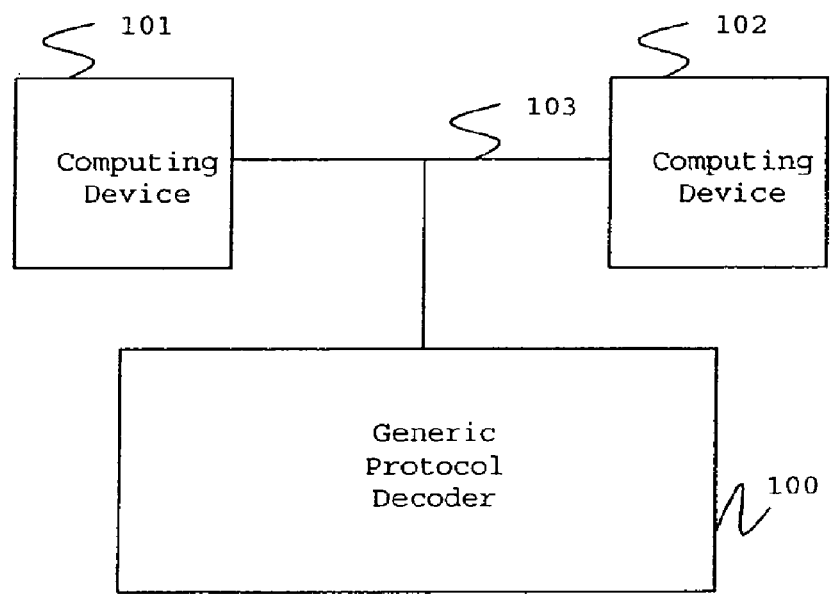
FIG. 1 is a block diagram of a generic protocol decoder coupled to computing devices according to an example embodiment.

FIG. 1 shows a simplified diagram of one embodiment of the current invention. Two computing devices 101 and 102 are connected via data communication connection 103. In one embodiment this is a serial connection. Any type of connection may be used, such as hardwired or wireless connections that are capable of transferring information. Computing device 101 transmits data to computing device 102 in the form of PDUs in one embodiment. A PDU may be any format of information compatible with a corresponding protocol. General protocol decoder (GPD) 100 is designed to decode PDUs so that they may be displayed in a human-readable format or other format as desired. In the embodiment shown, GPD 100 is a separate device that monitors a data communication addressed to a computing device. In another embodiment, GPD 100 is contained within a computing device receiving data through the connection.

Figure 2:
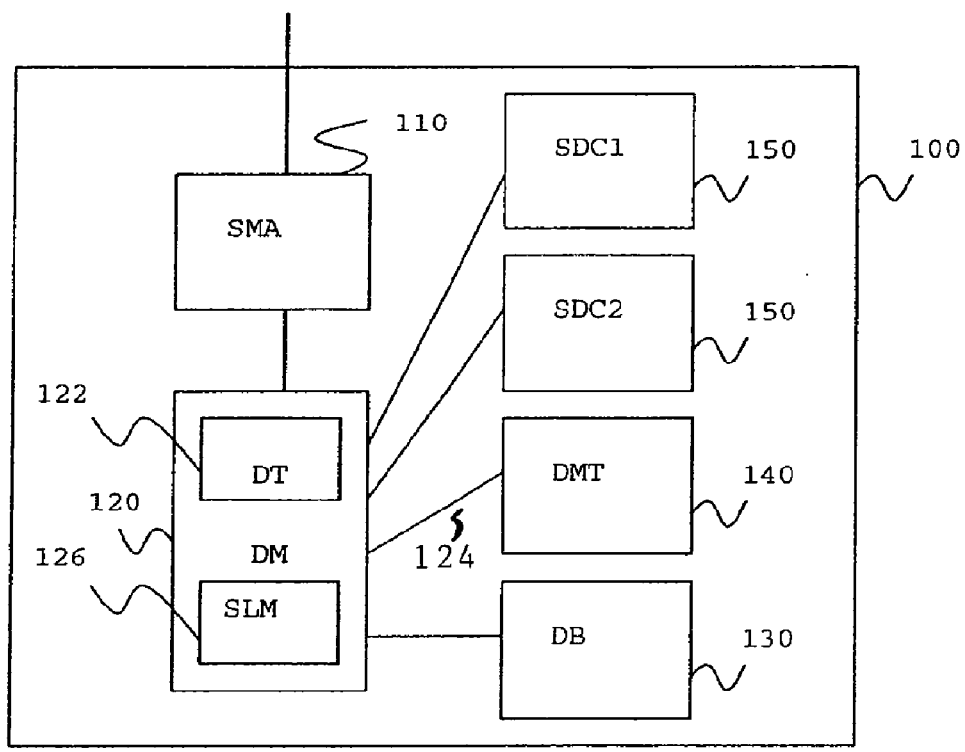
FIG. 2 is a block diagram of the generic protocol decoder of FIG. 1, according to an example embodiment.

FIG. 2 shows a more detailed diagram of the components of GPD 100 according to one embodiment of the current invention. GPD 100 contains SMA 110. SMA 110 performs two functions. First, it captures the bytes that traverse through connection 103. Second, it operates a higher level wrapper around that process, exposing a set of communication interfaces that can be used by a client to read all the monitored bytes.

Decode manager 120 accesses the bytes that traverse through connection 103 using the interface of the SMA 110. Operating on this data, decode manager 120 decodes each PDU into a human-readable format. In order to accomplish this analysis, decode manager 120 creates several components when initialized.

Decode thread 122 is created and performs decoding by creating and initializing a decode specific component (DSC) 130 for each protocol to be decoded. One such component is shown, labeled 130, though any number of such components may exist and operate simultaneously. Each DSC 130 represents an independent decode session. When the decode thread 122 initializes the DSC 130, the protocol to decipher is extracted and stored. Additionally, a decipher thread is created that takes care of all decoding for the specific protocol.

The decode thread 122 periodically acts on DSC 130. This causes DSC 130 to extract raw bytes from the SMA 110. An event is also set in the decipher thread causing the thread to read from the stored protocol. When the decipher thread is finished deciphering a protocol, DSC 130 calls on the decipher thread to exit, de-initialize and clean up.

Session list manager (SLM) 126 stores information pertaining to a decode session. SLM 126 is an internal component of the decode manager 120 used by multiple threads. Since it is used by multiple threads, SLM 126 uses a synchronization mechanism. SLM 126 stores any pertinent information concerning each session, such as a ThreadID. Each session is treated as independent so that the GPD can decode multiple protocols simultaneously. The decode manager uses SLM 126 and the information contained therein in part to communicate with decode thread 122 and manage each decode session.

Decode manager 120 also creates data manager 140. Data manager 140 acts to store data and is accessible to more than one component at the same time. Specifically, the messages deciphered from the monitored protocols are stored and accessed with this component.

Database thread 124 is created by decode manager 120 for performing all database operations. Such operations include reading deciphered messages from data manager 140.

Figure 3:
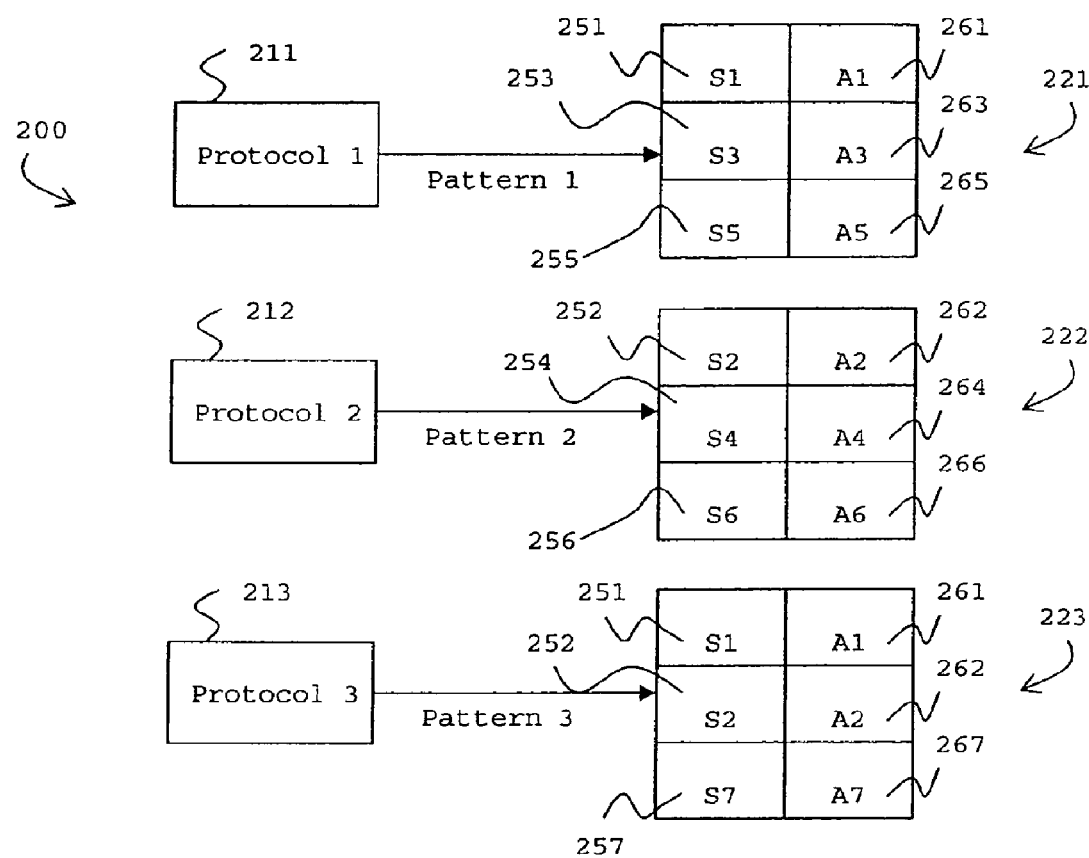
FIG. 3 is a block diagram illustrating patterns associated with various protocols and used by the generic protocol decoder of FIG. 1 to decode such protocols according to an example embodiment.

Decoding is provided by applying stored patterns to protocols. FIG. 3 shows a series of patterns according to one embodiment of the present invention. Three patterns contained in GDP 100 and accessed with database thread 124 are shown. These patterns decode protocols 211, 212, and 213. In other embodiments, many more patterns exist in GDP 100, each capable of decoding a protocol.

Protocol 211 is associated with pattern 221 and is used to decode that protocol. Pattern 221, as well as each other pattern, is comprised of a series of objects. Each of these objects is further comprised of a state object and an associated algorithm object. For example, pattern 221 contains state objects 251, 253 and 255 and associated algorithm objects 261, 263 and 265. Pattern 222 is composed of entirely different objects. However, pattern 223 contains objects used by patterns 221 and 222, as well as new objects. State object 251 and algorithm object 261 are contained in pattern 223 as well as pattern 221, while state object 252 and state algorithm 262 are shared by patterns 222 and 223. State object 257 and algorithm object 267 are used exclusively by pattern 223. Thus, objects are reused to create new patterns able to decipher new protocols. While the example shown only has three patterns, a system is likely to have many more, increasing the chance of reusing a component. In addition, if a new protocol is added that cannot be entirely deciphered by the existing objects, only those steps not handled by the existing objects need be added.

In operation the patterns are used by applying the algorithms in a series of steps to the protocol. The decipher thread determines the current state, and operates an implementation of the algorithm associated with that state on the protocol. When a PDU of protocol 212 is being decoded, the deciphering begins at a default state of pattern 222, here state object 252. State object 252 calls on its related algorithm object 262, which works on the PDU of protocol 212. In some cases, algorithm object 262 must finish all operations before proceeding to the next state. Occasionally the next state will not be dependant on the completed analysis of the current state and that state object may be called. Here, after algorithm object 262 has completed all of its processes, the next state is called, state object 254. The implementation of associated algorithm 264 works on the protocol at this point. The next state in pattern 222 is state object 256. After the final algorithm object 266 is finished working on the protocol, the PDU is completely deciphered. The deciphered human-readable message of the protocol is stored in the data manager 140. The entire message may be stored after the completion of the decode process, or data may be stored during each step of deciphering the PDU. At this point, having decoded and stored the data, the decode session is either stopped or waits to receive another PDU.

Various embodiments of the invention are software based. The following section describes an embodiment in which the GDP and its components are implemented as software modules.

The DecodeManager component is accessed using an interface IDecodeManager. Clients call this interface for starting a decode session. A decode session is begun according to an Initialize( ) function of the DecodeManager component.

The decoding thread (DM_DT) is created and initializes itself when IDecodeManager::Initialize( ) is called. The DecodeManager component uses a set of events and an ISessionListManager interface passed in as a thread parameter to communicate with the DM_DT. The DataManager component is also created by IDecodeManager::Initialize( ), and stores all the deciphered protocol specific messages. The DecodeManager component also creates the database thread (DM_DBT). The DM_DBT takes care of all database operations and reads deciphered messages from the DataManager component. The SessionListManager component is the last component created when the initialization function is called. The SessionListManager component is contained inside the DecodeManager component, and is only accessible by the DecodeManager component. Other components interact with the SessionListManager component through the DM_DT. The SessionListManager stores the ThreadID of the DM_DT and other information relevant to the DM_DT.

The DM_DT creates the DSC. The DM_DT uses the IDecode interface of the DSC for decoding purposes. After creating the DSC, DM_DT calls IDecode::Initialize( ). The Initialize( ) function extracts the protocol to decipher using an interface ICommonData. The IDataManager interface is stored for future use.

A vector data structure (DSC_PDU_DS) is created by the DSC to store monitored bytes when the DM_DT calls IDecode::Initialize( ). The DSC_PDU_DS contains attributes Nlen, ByteType, PByteArray, and StrTime. Nlen gives the length of the byte array. ByteType identifies whether the bytes are read or write bytes. PByteArray is an interface to the component that encapsulates the array of bytes. StrTime is a marker of the time the bytes were read from the port stored in the form of a string.

The DSC decipher thread (DSC_DT) is also created by IDecode::Initialize( ). The DSC_PDU_DS is passed to this thread as a parameter which it uses to access the PDU to decipher. Also, a session key is passed in. After this thread is initialized by the DSC, it waits on two events, a poll event and an exit event.

The poll event is set within DSC::Poll( ). The Poll( ) function is called by the DM_DT using the IDecode interface of the DSC. The DM_DT waits on a set of events that may be set by the DataManager component or the DSC. These events are set for the start of a decoding session, during a decoding session, and for the end of a decoding session. The poll event signals the DSC_DT to read bytes from the DSC_PDU_DS. The thread reads the last node of the DSC_PDU_DS, which operates in a last in first out manner. This data is given to the object pattern for deciphering. Within the poll event the DSC_DT waits on a DecodeTraverse event and a DecodeDone event.

The exit event is set from DSC:Stop( ) by the DM using the IDecode interface. This de-initializes the object pattern and performs clean up.

The DSC also uses an IDecodeService interface so that the object pattern can communicate back to the DSC. This interface includes the DecodeDone( ) function, which sets the DecodeTraverse and DecodeDone events on the DSC_DT. The function is called by the object pattern when it has finished deciphering the PDU for the current state. The DSC checks the IDecodeState interface pointer, which the DecodeDone( ) function takes as a parameter. If the pointer is null, then the DecodeDone event is set, because a full cycle of decoding is done on a PDU. This event causes the DSC to get the next packet. If the pointer is valid then it replaces the existing state with the new one and sets the DecodeTraverse on the DSC_DT. In the case the function is called by DefaultState, the DSC caches the pointer twice. This is done in order to return to the proper state when the PDU has been decoded.

The object patterns consist of state and algorithm components. Different combinations of these reusable objects form a pattern. Three design patterns are used in forming the object patterns; a state pattern, strategy pattern, and bridge pattern.

The DSC creates the first instance of a state component. A state pattern is maintained between the DSC and the state objects so that the DSC uses the same interface to interact with each state object. The first state component created is generally DefaultState. The DefaultState component then calls IDecodeState::Initialize( ). The Initialize( ) function takes in as a parameter a value that specifies the protocol being decoded.

DefaultState::Initialize( ) is called and performs two steps. First, it creates the next state component in line using a state index identifier tag for the current state, the default state. For example the tag may be '1'. This it uses along with the ProtocolIndex passed in to compare with data stored in a persistent medium, an example structure shown in table 1. Given the ProtocolIndex and the StateIndex, the ProgID of the next state is returned. For example if the value of ProtocolIndex is '6299' associated with the FBII protocol, and the current StateIndex associated with the DefaultState is '1', the next state object might be ValidateState, as shown in table 1.

TABLE 1

| ProtocolIndex | StateIndex | ProgID of next state component |
|---|---|---|
| 6299 | 1 | ValidateState |
| 6299 | 2 | CRCState |
| 6299 | 3 | IdentifyState |
| 14513315 | 3 | DecryptState |
| 14513315 | 4 | IdentifyState |

The second action performed is calling ValidateState::Initialize( ) with the ProtocolIndex passed in. In other states, the Initialize( ) function is called for the appropriate next state. The algorithm object is created by the Initialize( ) function, in this example the ValidateAlgorithm. This allows a strategy pattern to be maintained between the state objects and the algorithm objects. The state objects therefore interact with each different algorithm object in the same manner. ValidateState::Initialize( ) also determines the AlgorithmIndex for this state.

The algorithm object then compares the ProtocolIndex and the AlgorithmIndex to data stored in a persistent medium, an example structure shown in table 2, to find the ProgID of the algorithm implementation. For example, the ProtocolIndex for FBII is '6299' and assuming the AlgorithmIndex is '1001' for the validate algorithm, the FBII_ValidateAlgorithmImp implementation is returned, as shown in table 2. This implementation operates on the PDU. This maintains a bridge pattern between the algorithm and the concrete implementations. Each algorithm communicates with each implementation according to an identical interface. The Initialize( ) function then creates the next state and calls its initialize function similar to the actions performed by DefaultState.

TABLE 2

| ProtocolIndex | AlgorithmIndex | ProgID of XXX_YYYAlgorithmImp component |
|---|---|---|
| 6299 | 1001 | FBII_ValidateAlgorithmImp |
| 6299 | 9999 | FBII_IdentifyAlgorithmImp |
| 1413315 | 1003 | ADEMCO_DecryptAlgorithmIMP |

The final state is the state object IdentifyState. This performs in a manner similar to the other states, except that it returns back to the original DefaultState object, calling the DefaultState::Initialize( ) function.

Because of the generic architecture of the state and algorithm objects and algorithm implementations, new states and algorithms can be easily plugged into the system. If a new implementation of an existing algorithm is developed, it may also be inserted without modifying the interactions of any of the components of the system.

In operation, the state objects communicate with the DSC to facilitate the decoding of a PDU. The DSC acts on the state objects using the IDecodeState interface. The DSC calls the Decode( ) function on the state object, passing in as a parameter the IDecodeService interface pointer through which the state object can communicate back with the DSC. The state object generally calls IDecodeService::GetData( ) with the IByteArray pointer passed in as a parameter so that the state object gets the PDU to decipher. After this data is operated on and deciphered or initially, as in the case of the DefaultState object, the state object calls IDecodeService::DecodeDone( ) with a pointer for the next state or the default state passed in.

Conclusion

A protocol decoder is described. A serial connection is monitored and the data transferred across the connection is processed by the decoder. The decoder operates using pattern objects composed of state and algorithm objects.

Each state and algorithm object performs a portion of the deciphering. By combining multiple state and algorithm objects, an entire packet may be decoded for a given protocol. Multiple patterns of state and algorithm objects can be used to decode a variety of protocols.

State and algorithm objects can be reused in these patterns, so that each new protocol does not require entirely new decoding procedure. The generality as well as the usefulness of the GPD increases as the state and algorithm objects become more granular. This makes the objects reusable in the future for new protocols, maximizing the reuse and coverage.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those skilled in the art.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A system comprising:
 a serial monitor application;
 a decode device coupled to the serial monitor application; and
 a plurality of patterns stored by the decode device, such that the decode device operates at least one decoding session able to decode a protocol data unit detected by the serial monitor application using one of the plurality of patterns, wherein each pattern consists of a series of objects, wherein each object includes a state object and an associated algorithm object, and wherein each object of each pattern is adapted to be reused to create a new pattern during run time for decoding a new protocol, and wherein if a portion of the new protocol cannot be decoded by the new pattern, at least one new object is added into the new pattern to handle the portion of the new protocol that cannot be decoded by the new pattern.

2. The system of claim 1 wherein the one of the plurality of patterns is selected based on a protocol of the protocol data unit.

3. The system of claim 1 further comprising:
 a database thread initiated by the decode device for accessing the plurality of patterns; and
 a decode thread initiated by the decode device for applying the plurality of patterns to the protocol data unit.

4. The system of claim 1 further comprising:
 a data device that stores decoded human readable messages coupled to the decode device.

5. The system of claim 1 further comprising:
 a session list manager contained in the decode device that enables the decode device to operate a plurality of decoding sessions able to decode a plurality of protocol data units simultaneously.

6. The system of claim 1 wherein the decoding session includes a state.

7. The system of claim 6 wherein each of the plurality of patterns include at least one object composed of a state value and an algorithm.

8. The system of claim 7 wherein the selected pattern is used by selecting one of the at least one objects having a state value matching the state of the decode session and applying the algorithm of the selected object to the protocol data unit.

9. The system of claim 8 wherein each of the at least one objects may be included in one or more of the plurality of patterns.

10. A method comprising:
 forming a plurality of patterns such that each pattern consists of a plurality of objects, each object being associated with a state value and an algorithm;
 monitoring a data communication for a protocol data unit;
 selecting one of the plurality of patterns as a function of a specified protocol of the protocol data unit; and
 applying the algorithms associated with the objects of the selected pattern to the protocol data unit by a decode manager, wherein each object of each pattern is adapted to be reused to create a new pattern during run time for decoding a new protocol, and wherein if a portion of the new protocol cannot be decoded by the new pattern, at least one new object is added into the new pattern to handle the portion of the new protocol that cannot be decoded by the new pattern.

11. The method of claim 10 wherein the data communication exists over a serial connection.

12. A method comprising:
 forming a plurality of patterns such that each pattern consists of a plurality of objects, each object being associated with a state value and an algorithm;
 monitoring a data communication for a protocol data unit;
 selecting one of the plurality of patterns as a function of a specified protocol of the protocol data unit;
 selecting one of the plurality of objects of the pattern as a function of the state value of the object and a system state;
 applying the algorithm associated with the selected object to the protocol data unit by a decode manager;
 updating the system state as a function of the protocol of the protocol data unit; and
 repeating the steps of selecting one of the plurality of objects, applying the algorithm associated with the selected object, and updating the system state until the protocol data unit is decoded, wherein each object of each pattern is adapted to be reused to create a new pattern during run time for decoding a new protocol, and wherein if a portion of the new protocol cannot be decoded by the new pattern, at least one new object is added into the new pattern to handle the portion of the new protocol that cannot be decoded by the new pattern.

13. The method of claim 12 wherein the current state is a decryption state, a validation state, a redundancy state, an identification state, or a null state.

14. The method of claim 13 further comprising:
 if the system state is updated to the null state, ending operations on the protocol data unit.

15. A method comprising:
 monitoring data communications for a protocol data unit;
 selecting one of a plurality of patterns as a function of a specified protocol of the protocol data unit, wherein each pattern consists of a series of objects, and wherein each object includes a state object and an associated algorithm object; and
 applying the algorithms associated with the objects of the selected pattern to the protocol data unit by a decode manager to decode data in the protocol data unit in accordance with the corresponding algorithm, wherein each object of each pattern is adapted to be reused to create a new pattern during run time for decoding a new protocol, and wherein if a portion of the new protocol cannot be decoded by the new pattern, at least one new object is added into the new pattern to handle the portion of the new protocol that cannot be decoded by the new pattern.

16. The method of claim 15 and further comprising persisting the decoded data.

17. The method of claim 15 wherein the data communications are monitored at a serial port.

18. The method of claim 15 and further comprising selecting the pattern and applying the algorithm during run time.

19. A physical computer readable storage device having instructions stored thereon for causing a computer to execute a method comprising:
 monitoring data communications for a protocol data unit;
 selecting one of a plurality of patterns as a function of a specified protocol of the protocol data unit, wherein each pattern consists of a series of objects, and wherein each object includes a state object and an associated algorithm object; and
 applying the algorithms associated with the objects of the selected pattern to the protocol data unit to decode data in the protocol data unit in accordance with the corresponding algorithm, wherein each object of each pattern is adapted to be reused to create a new pattern during run time for decoding a new protocol, and wherein if a portion of the new protocol cannot be decoded by the new pattern, at least one new object is added into the new pattern to handle the portion of the new protocol that cannot be decoded by the new pattern.

* * * * *